US012508868B2

(12) United States Patent
Lian et al.

(10) Patent No.: US 12,508,868 B2
(45) Date of Patent: Dec. 30, 2025

(54) INTEGRATED THERMAL MANAGEMENT SYSTEM, VEHICLE, AND THERMAL MANAGEMENT CONTROL METHOD

(71) Applicant: BYD COMPANY LIMITED, Guangdong (CN)

(72) Inventors: Yubo Lian, Shenzhen (CN); Heping Ling, Shenzhen (CN); Yilin Zhong, Shenzhen (CN); Gan Song, Shenzhen (CN); Jingke Zhang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 176 days.

(21) Appl. No.: 18/373,721

(22) Filed: Sep. 27, 2023

(65) Prior Publication Data

US 2024/0017589 A1 Jan. 18, 2024

Related U.S. Application Data

(63) Continuation of application No. PCT/CN2021/124712, filed on Oct. 19, 2021.

(30) Foreign Application Priority Data

May 11, 2021 (CN) .......................... 202110511353.8

(51) Int. Cl.
*B60H 3/00* (2006.01)
*B60H 1/00* (2006.01)
(Continued)

(52) U.S. Cl.
CPC ..... *B60H 1/00735* (2013.01); *B60H 1/00278* (2013.01); *B60H 1/00385* (2013.01);
(Continued)

(58) Field of Classification Search
CPC ............ B60H 1/00735; B60H 1/00278; B60H 1/00385; B60L 53/60; B60L 58/12; B60L 58/26; H02P 27/06
(Continued)

(56) References Cited

U.S. PATENT DOCUMENTS

2017/0174039 A1 6/2017 Schedel et al.
2020/0284497 A1* 9/2020 Blatchley ........... B60H 1/00899

FOREIGN PATENT DOCUMENTS

CN 107599782 A 1/2018
CN 207257294 U 4/2018
(Continued)

OTHER PUBLICATIONS

International Search Report and Written Opinion for Application No. PCT/CN2021/124712, mailed on Feb. 16, 2022, 9 pages.

*Primary Examiner* — Davis D Hwu
(74) *Attorney, Agent, or Firm* — Sheppard Mullin Richter & Hampton LLP (57) ABSTRACT

An integrated thermal management system, includes: a heat pump subsystem that includes a heat pump subsystem detector configured to detect heat pump state information of the heat pump subsystem; a cooling subsystem of a high-voltage system is configured to exchange heat between the heat pump subsystem and a high-voltage system of a vehicle; a battery detector is configured to detect battery state information of a vehicle battery; an user interface is configured to receive setting information of a thermal demand of a passenger compartment of a vehicle; and a controller is configured to determine a thermal management demand of the vehicle battery according to the battery state information, determine a thermal management demand of the passenger compartment according to the setting information, and determine a heat supplementation demand according to the thermal management demand of the vehicle battery, the thermal management demand of the passenger compartment, and the heat pump state information.

12 Claims, 3 Drawing Sheets

(51) Int. Cl.
  *B60L 53/60* (2019.01)
  *B60L 58/12* (2019.01)
  *B60L 58/26* (2019.01)
  *H02P 27/06* (2006.01)

(52) U.S. Cl.
  CPC ............... *B60L 53/60* (2019.02); *B60L 58/12* (2019.02); *B60L 58/26* (2019.02); *H02P 27/06* (2013.01)

(58) Field of Classification Search
  USPC ......................................................... 165/42
  See application file for complete search history.

(56) References Cited

FOREIGN PATENT DOCUMENTS

| | | |
|---|---|---|
| CN | 108556660 A | 9/2018 |
| CN | 207825996 U | 9/2018 |
| CN | 109059341 A | 12/2018 |
| CN | 109080406 A | 12/2018 |
| CN | 208180721 U | 12/2018 |
| CN | 208263921 U | 12/2018 |
| CN | 109291761 A | 2/2019 |
| CN | 109398030 A | 3/2019 |
| CN | 110103665 A | 8/2019 |
| CN | 110329112 A | 10/2019 |
| CN | 110497768 A | 11/2019 |
| CN | 111347928 A | 6/2020 |
| CN | 111347939 A | 6/2020 |
| CN | 111354998 A | 6/2020 |
| CN | 111355001 A | 6/2020 |
| CN | 111806196 A | 10/2020 |
| CN | 112297749 A | 2/2021 |
| CN | 112406632 A | 2/2021 |
| CN | 112550022 A | 3/2021 |
| CN | 112757870 A | 5/2021 |
| CN | 112977002 A | 6/2021 |
| CN | 113059980 A | 7/2021 |
| JP | 2017077880 A * | 4/2017 ......... B60H 1/00278 |
| JP | 2020-110022 A | 7/2020 |
| JP | 2020-121633 A | 8/2020 |
| JP | 2020124012 A | 8/2020 |
| WO | 2020125684 A1 | 6/2020 |

* cited by examiner

INTEGRATED THERMAL MANAGEMENT SYSTEM, VEHICLE, AND THERMAL MANAGEMENT CONTROL METHOD

CROSS-REFERENCE TO RELATED APPLICATIONS

This application is a Continuation Application of International Patent Application No. PCT/CN2021/124712, filed on Oct. 19, 2021, which is based on and claims priority to and benefits of Chinese Patent Application No. 202110511353.8, filed on May 11, 2021. The entire content of all of the above-referenced applications is incorporated herein by reference.

FIELD

The present disclosure relates to the field of vehicle technology, and more particularly, to an integrated thermal management system, a vehicle adopting the integrated thermal management system, and a thermal management control method.

BACKGROUND

In the related art, according to a thermal management system of a vehicle, a water Positive Temperature Coefficient (PTC) heating loop loses more heat at a low temperature, resulting in not high heating efficiency. In addition, battery heating and air-conditioning auxiliary heating are both performed by this loop, resulting in high energy consumption and influence on battery life. When a battery is cooled, there are two heat exchanges of a refrigerant and a coolant with the battery, resulting in low heat exchange efficiency. By adding an auxiliary heater loop to assist in air-conditioning heating, the system is complicated, and the cost rises.

SUMMARY

An integrated thermal management system, a vehicle, and a thermal management control method are provided to reduce the energy consumption, improve the utilization efficiency of vehicle energy, and reduce the cost.

In a first aspect, the present disclosure provides an integrated thermal management system, including: a heat pump subsystem, a cooling subsystem of a high-voltage system, a battery detector, a user interface, and a controller. The heat pump subsystem includes a heat pump subsystem detector configured to detect heat pump state information of the heat pump subsystem. The high-voltage system includes a cooling subsystem configured to exchange heat between the heat pump subsystem and a high-voltage system of a vehicle. The battery detector is configured to detect battery state information of a vehicle battery. The user interface, configured to receive setting information of a thermal demand of a passenger compartment of a vehicle. The controller is configured to determine a thermal management demand of the vehicle battery according to the battery state information, determine a thermal management demand of the passenger compartment according to the setting information, and determine a heat supplementation demand according to the thermal management demand of the vehicle battery, the thermal management demand of the passenger compartment, and the heat pump state information.

According to the integrated thermal management system of this embodiment of the present disclosure, the heat pump subsystem is combined with a cooling subsystem of the high-voltage system, and the controller determines the heat supplementation demand according to the thermal management demand of the vehicle battery, the thermal management demand of the passenger compartment, and the state information of the heat pump subsystem. Thus, when the vehicle battery and/or the passenger compartment have/has a heating demand and the heat pump subsystem cannot satisfy the heating demand, waste heat generated by the high-voltage system may be utilized to support heat supplementation to the heat pump subsystem through the cooling subsystem of the high-voltage system. In addition, the integrated thermal management system of this embodiment of the present disclosure may realize the deep integration and cooperative control of the modules of the vehicle thermal management system, realize the efficient management of vehicle energy, improve the comprehensive utilization rate of the energy, and achieve a low cost.

In a second aspect, the present disclosure provides a vehicle, including an integrated thermal management system.

According to the vehicle of this embodiment of the present disclosure, by adopting the integrated thermal management system of the above embodiment, when the vehicle battery and/or the passenger compartment have/has a heating demand and the heat pump subsystem cannot satisfy the heating demand, heat supplementation to the heat pump subsystem may be achieved using the cooling subsystem of the high-voltage system. In addition, the deep integration and cooperative control of the modules of the vehicle thermal management system may be realized, the efficient management of vehicle energy may be realized, and the comprehensive utilization rate of the energy may be improved.

In a third aspect, the present disclosure provides a thermal management control method, including: acquiring battery state information of a vehicle battery, and acquiring setting information of a thermal demand of a passenger compartment; determining a thermal management demand of the vehicle battery according to the battery state information of the vehicle battery, determining a thermal management demand of the passenger compartment according to the setting information, and controlling an operating mode of a heat pump subsystem according to the thermal management demand of the passenger compartment and the thermal management demand of the vehicle battery; acquiring heat pump state information of the heat pump subsystem; and determining, according to the thermal management demand of the vehicle battery, the thermal management demand of the passenger compartment, and the heat pump state information, whether the heat pump subsystem has a heat supplementation demand.

According to the thermal management control method of this embodiment of the present disclosure, whether the heat pump subsystem has a heat supplementation demand is determined according to the thermal management demand of the vehicle battery, the thermal management demand of the passenger compartment, and the heat pump state information of the heat pump subsystem, and a basis may be provided for heat supplementation to the heat pump subsystem by the cooling subsystem of the high-voltage system. In addition, vehicle heat sources may further operate together to improve the utilization rate of the vehicle energy.

Additional aspects and advantages of the present disclosure will be set forth in part in the following description which will become apparent from the following description or will become apparent through the practice of the present disclosure.

BRIEF DESCRIPTION OF THE DRAWINGS

The foregoing and/or additional aspects and advantages of the present disclosure will become apparent and more readily appreciated from the following descriptions of the embodiments made with reference to the drawings.

DETAILED DESCRIPTION

Embodiments of the present disclosure are described in detail below, the embodiments described with reference to the drawings are some of the embodiments of the present disclosure, and the embodiments of the present disclosure are described in detail below with reference to FIG. 1 to FIG. 5.

An integrated thermal management system according to an embodiment of a first aspect of the present disclosure is described below with reference to FIG. 1 to FIG. 3.

Figure 1:
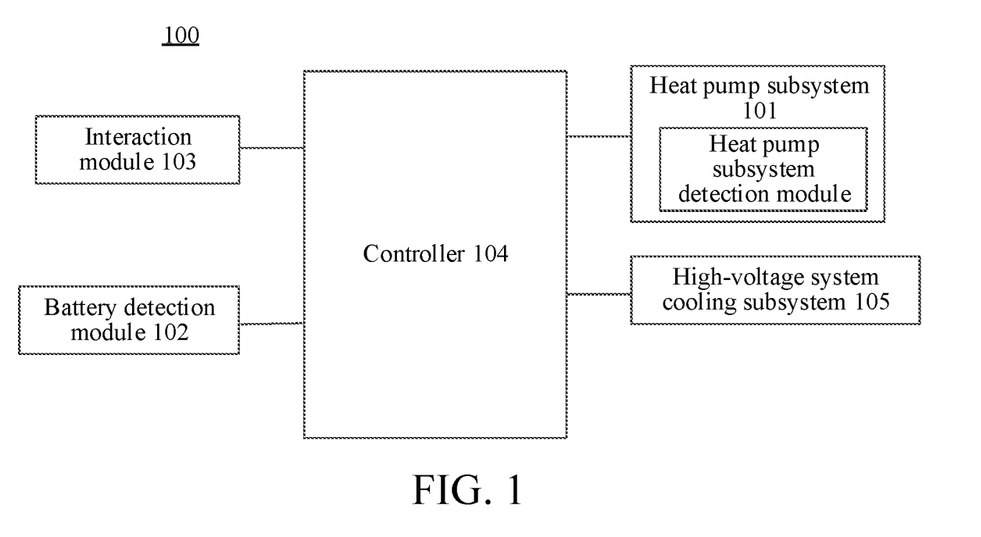
FIG. 1 is a block diagram of an integrated thermal management system according to an embodiment of the present disclosure.

FIG. 1 is a block diagram of an integrated thermal management system 100 according to an embodiment of the present disclosure. As shown in FIG. 1, the integrated thermal management system 100 according to this embodiment of the present disclosure includes a heat pump subsystem 101, a battery detector/battery detection module 102, a user interface/interaction module 103, a cooling subsystem of the high-voltage system or a high-voltage system cooling subsystem 105, and a controller 104.

The heat pump subsystem 101 includes a heat pump subsystem detection module or heat pump subsystem detector. The heat pump subsystem detection module is configured to detect heat pump state information or state information of the heat pump subsystem 101, such as internal and external ambient temperatures of a vehicle, and a refrigerant pressure and a refrigerant temperature in the heat pump subsystem 101. The high-voltage system cooling subsystem 105 is a cooling loop of a high-voltage system. In this embodiment of the present disclosure, the high-voltage system cooling subsystem 105 may perform heat exchange with the heat pump subsystem 101 and the high-voltage system of the vehicle.

The high-voltage system cooling subsystem 105 may be configured to cool the high-voltage system and remove heat from the high-voltage system. The heat of the high-voltage system may also be configured to supply to the heat pump subsystem 101. In an embodiment, the heat of the high-voltage system heats a coolant in the high-voltage system cooling subsystem 105 and performs heat exchange with the heat pump subsystem 101, so as to supplement heat to the heat pump subsystem 101.

The battery detection module 102 is configured to detect battery state information or state information of a vehicle battery, such as a battery temperature, a battery power, or a voltage. The interaction module 103 is configured to receive setting information of a thermal demand of a passenger compartment. A user sets the thermal demand of the passenger compartment through the interaction module 103, for example, turning on and off air-conditioning refrigeration, turning on and off air-conditioning heating, whether heating and dehumidification are needed or whether the battery needs to be heated, and a heating temperature.

The controller 104 is configured to determine a thermal management demand of the vehicle battery according to the state information of the vehicle battery, determine a thermal management demand of the passenger compartment according to the setting information, and determine a heat supplementation demand according to the thermal management demand of the vehicle battery, the thermal management demand of the passenger compartment, and the state information of the heat pump subsystem 101.

Figure 2:
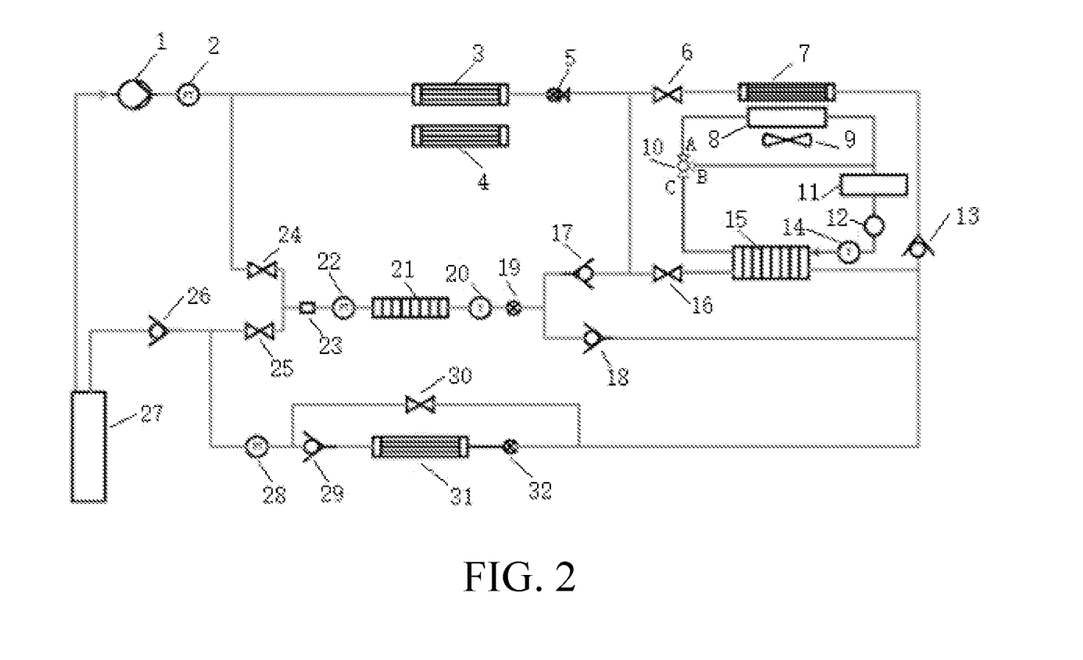
FIG. 2 is a schematic diagram of an integrated thermal management system according to an embodiment of the present disclosure.

In an embodiment of the present disclosure, FIG. 2 is a schematic diagram of an integrated thermal management system 100 according to an embodiment of the present disclosure. As shown in FIG. 2, the heat pump subsystem 101 includes a compressor 1, a first heat exchanger 3, a first electronic expansion valve 5, a first electromagnetic valve 6, a second heat exchanger 7, a first one-way valve 13, a plate heat exchanger 15, a second electromagnetic valve 16, a second one-way valve 17, a second electronic expansion valve 19, a third one-way valve 18, a battery pack direct-cooling plate 21, a caliber-adjustable throttle valve 23, a third electromagnetic valve 24, a fourth electromagnetic valve 25, a fourth one-way valve 26, a gas-liquid separator 27, a fifth one-way valve 29, a fifth electromagnetic valve 30, a third heat exchanger 31, and a third electronic expansion valve 32.

An output end of the compressor 1 is connected to a first interface of the first heat exchanger 3. A second interface of the first heat exchanger 3 is connected to a first interface of the second heat exchanger 7. The first electronic expansion valve 5 and the first electromagnetic valve 6 are arranged/disposed in a pipeline between the second interface of the first heat exchanger 3 and the first interface of the second heat exchanger 7. A second interface of the second heat exchanger 7 is connected to a first interface of the first one-way valve 13. A second interface of the first one-way valve 13 is connected to a second interface of the plate heat exchanger 15, a second interface of the third one-way valve 18, and a second interface of the third heat exchanger 31. The third electronic expansion valve 32 is arranged/disposed on a pipeline between the second interface of the first one-way valve 13 and the second interface of the third heat exchanger 31. A first interface of the third heat exchanger 31 is connected to a second interface of the fifth one-way valve 29. A first interface of the fifth one-way valve 29 is connected to a second interface of the fourth one-way valve 26. The fifth electromagnetic valve 30 is arranged/disposed on a pipeline between the first interface of the fifth one-way valve 29 and the second interface of the first one-way valve 13. A first interface of the fourth one-way valve 26 is connected to a first end of the gas-liquid separator 27. A second end of the gas-liquid separator 27 is connected to an input end of the compressor 1. A first interface of the plate heat exchanger 15 is connected to a second interface of the second one-way valve 17. The second electromagnetic valve 16 is arranged/disposed on a pipeline between the first interface of the plate heat exchanger 15 and the second interface of the second one-way valve 17. A first node is provided between the second electromagnetic valve 16 and the second interface of the second one-way valve 17. The first node is connected between the first electronic expansion valve 5 and the first electromagnetic valve 6. A first interface of the second one-way valve 17 and a first interface of the third one-way valve 18 are both connected to a second end of the battery pack direct-cooling plate 21. The second electronic expansion valve 19 is arranged/disposed at the second end of the battery pack direct-cooling plate 21. A first end of the battery pack direct-cooling plate 21 is connected to the output end of the compressor 1 and the second interface of the fourth one-way valve 26 through the throttle valve 23. The third electromagnetic valve 24 is arranged/disposed on a pipeline between the throttle valve 23 and the output end of the compressor 1. The fourth electromagnetic valve 25 is arranged/disposed on a pipeline between the throttle valve 23 and the second interface of the fourth one-way valve 26.

Based on the foregoing heat pump subsystem 101, a thermal management loop of the battery is connected to a thermal management loop of the passenger compartment, and the battery pack direct-cooling plate 21 is used for heating or cooling the battery in a manner of direct cooling and direct heating of the battery. When a battery pack needs to be cooled, the compressor 1 drives a refrigerant to enter the battery pack direct-cooling plate 21 for evaporation and heat absorption to cool the battery. When the battery pack needs to be heated, the compressor 1 drives the refrigerant to enter the battery pack direct-cooling plate 21 for condensation and heat release to heat the battery. The process is latent heat exchange and medium phase change heat exchange, and the temperature is kept in a small range in the battery pack, thereby saving a coolant loop, a water pump 12, and the plate heat exchanger 15 in the thermal management circuit of the battery, and reducing the system cost. The battery is heated or cooled by direct cooling and direct heating of the battery, and the heat exchange in the system changes from two heat exchanges to one heat exchange. The battery pack direct-cooling plate 21 is in good contact with a battery core. The heat exchange efficiency is higher than that of the traditional cooling plate, thereby reducing energy consumption. In the present disclosure, the battery cooling or heating mode is direct cooling and direct heating, that is, refrigerant phase change heat change, which has a higher heat exchange coefficient, can realize rapid cooling and heating of the battery, reduce the proportion of high and low temperature unsuitable operating temperature sections of the battery, and prolong the service life of the battery. The temperature change of the refrigerant is small in the process of phase change heat exchange, and the temperature uniformity of the battery is good, which is beneficial to the consistency management and life of the battery.

In addition, the first end of the battery pack direct-cooling plate 21 in a loop of the heat pump subsystem 101 is provided with the caliber-variable throttle valve 23. When the battery and the air conditioner have a cooling or heating demand at the same time, a caliber of the throttle valve 23 is obtained by table look-up, and the caliber is actively adjusted to further adjust the system pressure and temperature, thereby realizing the temperature control of a medium flowing through the passenger compartment and the battery thermal management module (the temperature of a direct-cooling and direct-heating refrigerant directly affects the battery temperature).

In an example, the controller 104 controls different operating modes of the heat pump subsystem 101 by switching different valve body combinations to satisfy the heating and cooling demands of the passenger compartment and/or the battery pack.

In an embodiment of the present disclosure, the high-voltage system may include an electric drive system. The electric drive system includes a motor. In an implementation, the electric drive system may further include a motor controller, a transmission, and the like. Similarly, the high-voltage system may also be a charging and distribution system. The charging and distribution system includes DC-DC, an on board charger (OBC), a distribution box, and the like. The high-voltage system cooling subsystem 105 corresponds to the high-voltage system. A coolant pipe in the high-voltage system cooling subsystem 105 may be configured in contact with heating devices such as a winding of the motor and an IGBT of the motor controller. When a coolant flows through the heating devices such as the winding of the motor and the IGBT of the motor controller, heat of the heating devices such as the winding of the motor and the IGBT of the motor controller may be taken away. Similarly, the heating quantity of the heating devices such as the winding of the motor and the IGBT of the motor controller may be adjusted to heat the coolant flowing therethrough.

Figure 3:
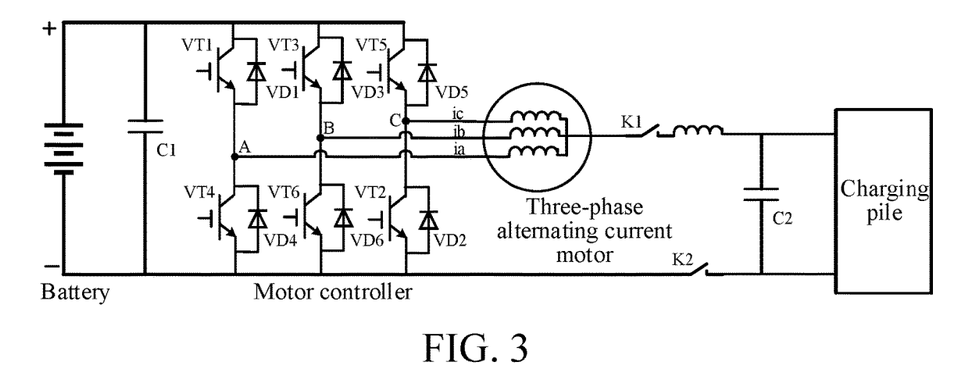
FIG. 3 is a schematic diagram of a high-voltage electric drive control loop according to an embodiment of the present disclosure.

FIG. 3 is a schematic diagram of a high-voltage electric drive control loop according to an embodiment of the present disclosure. In an embodiment, an electric drive system includes a battery, a motor controller, a motor (three-phase alternating current motor), an inductor, and a switch. The battery is connected to the motor controller through positive and negative direct current buses. The motor controller is connected to the motor through three-phase lines. Three-phase windings of the motor are connected together to form a neutral point. An N line led out from the neutral point is connected to the inductor through an inductor switch K1. The inductor is connected to an energy storage capacitor C2. The energy storage capacitor C2 is connected to the motor controller through a bus negative switch K2. When the system is used for charging, positive and negative poles of an external power supply device (charging pile) are connected to both ends of the energy storage capacitor C2, respectively.

As shown in FIG. 2, the high-voltage system cooling subsystem 105 includes a water pump 12, a motor radiator 8, a fan 9, and a three-way valve 10. A heat exchange medium pipeline of the high-voltage system cooling subsystem 105 is configured in contact with the heating device of the high-voltage system. The heat generated by the operation of the high-voltage system is used for heating a heat exchange medium in the heat exchange medium pipeline.

The high-voltage system cooling subsystem 105 performs heat exchange with the heat pump subsystem 101 through the plate heat exchanger 15 of the heat pump subsystem 101. In an embodiment, a first interface of the water pump 12 is connected to a third interface of the plate heat exchanger 15 of the heat pump subsystem 101. A second interface of the water pump 12 is connected to a first cooling interface of the high-voltage system. A port C of the three-way valve 10 is connected to a fourth interface of the plate heat exchanger 15 of the heat pump subsystem 101. A port B of the three-way valve 10 is connected to a second cooling interface of the high-voltage system. A port A of the three-way valve 10 is connected to a first interface of the motor radiator 8. A second interface of the motor radiator 8 is connected to the second cooling interface of the high-voltage system. The fan 9 corresponds to the motor radiator 8.

In some embodiments, the heat pump subsystem 101 further includes a heat pump subsystem detection module. The heat pump subsystem detection module is configured to detect state information of the heat pump subsystem 101, such as internal and external ambient temperatures of the vehicle, and a refrigerant pressure and temperature. The controller 104 determines a heat supplementation demand and a heat supplementation power according to the thermal management demand of the vehicle battery, the thermal management demand of the passenger compartment, and the state information of the heat pump subsystem 101.

In this embodiment, the controller 104 is further configured to determine, in response to the heat supplementation demand, a heat supplementation mode according to a running state of the vehicle, obtain a heat supplementation power according to the state information of the heat pump subsystem 101, and control an operating current of the motor in the high-voltage system according to the heat supplementation power and the heat supplementation mode, so as to supplement heat to the heat pump subsystem 101 through the high-voltage system cooling subsystem 105.

A motor current required for heat supplementation may be obtained according to the heat supplementation power. The high-voltage system may be controlled according to the heat supplementation mode and the motor current required for heat supplementation. By adjusting the current flowing through the high-voltage system, the components of the high-voltage system generate heat, and the heat generated by the high-voltage system heats the coolant in the high-voltage system cooling subsystem 105. The high-voltage system cooling subsystem 105 performs heat exchange with the heat pump subsystem 101, thereby supplementing heat to the heat pump subsystem 101.

In an embodiment, the high-voltage system is, for example, an electric drive system. As shown in FIG. 3, an electric drive control loop may control the motor controller by controlling the on and off of a switch K1 and a switch K2, so that the system may realize the functions of driving and parking charging. In a vehicle driving state, the switch K1 and the switch K2 are controlled to be turned off. The battery, the motor controller, and the alternating current motor form a motor driving circuit, and the system realizes the function of driving. When a charging pile is connected to the high-voltage electric drive control loop, the vehicle is in a parking charging state. The system controls the switch K1 and the switch K2 to be turned on. The battery, the motor controller, the alternating current motor, the inductor, the energy storage module, and the charging pile form a motor boosting charging circuit, and the system realizes the function of boosting charging.

When the components of the high-voltage system are operating, heat will be generated based on the Joule effect of a conductor. By adjusting the current flowing through the high-voltage system, the heat generated by the components of the high-voltage system may be adjusted. For example, the current flowing through switch devices and motor windings of the high-voltage system may be increased to increase the heating quantity of the switch devices and the motor windings of the high-voltage system. The heat generated by the high-voltage system heats the coolant in the high-voltage system cooling subsystem 105, and the high-voltage system cooling subsystem 105 may perform heat exchange with the heat pump subsystem 101 through the plate heat exchanger 15, so that the high-voltage system supplements heat to the heat pump subsystem 101 through the high-voltage system cooling subsystem 105. The electric drive system of the vehicle in different running states has different operating modes. A heat supplementation mode is determined according to a running state of the vehicle. A heat supplementation power is obtained according to the state information of the heat pump subsystem 101, and an operating current of the motor in the high-voltage system is controlled according to the heat supplementation power and the heat supplementation mode, so as to supplement heat to the heat pump subsystem 101 through the high-voltage system cooling subsystem 105. The heat generated by the high-voltage system may be fully utilized to supplement heat to the heat pump subsystem 101. The vehicle energy may be rationally utilized to realize high energy utilization rate, and the energy flows among the battery, the high-voltage system, and the passenger compartment, thus realizing high-integration energy management.

The heat supplementation to the heat pump subsystem using the high-voltage system includes four modes: motor-driven waste heat supplementation, motor reactive heat supplementation, motor stalling heating, and motor boosting cooperative heating heat supplementation by changing the on-off frequency of upper and lower bridges of an insulated gate bipolar transistor (IGBT) in the motor controller, which are described in detail below.

In the integrated thermal management system 100 of this embodiment of the present disclosure, the heat pump subsystem 101 and the high-voltage system cooling subsystem 105 are integrated and connected. When the heat pump subsystem 101 has a heat supplementation demand, heat generated by the motor is fully utilized. The motor is actively controlled to generate heat according to different running states of the vehicle, and a loop is designed in a heat pipe of the motor, so that the coolant passing through the high-voltage system directly flows to the plate heat exchanger 15 through the port B of the three-way valve 10, and the heat is supplemented to the heat pump subsystem 101 through the plate heat exchanger 15, thereby realizing the deep integration and cooperative control of the modules of the vehicle thermal management system, realizing the efficient management of the vehicle energy, and improving the comprehensive utilization rate of the energy. In addition, the heat generated by the motor is utilized, motor parts are reused to realize the heating function, and the system cost is reduced on the basis of realizing performance and multiple functions. Moreover, a suitable operating temperature of the non-enthalpy-increasing heat pump subsystem 101 reaches about −25° C., and when the battery is heated, the heat from the heat pump subsystem 101 may be utilized. The energy efficiency ratio is greater than 1, and the energy consumption is significantly reduced.

Based on the integrated thermal management system 100 of the above embodiment, an embodiment of a second aspect of the present disclosure provides a vehicle. The vehicle includes the integrated thermal management system 100 of the above embodiment. Definitely, the vehicle further includes other components and systems, which are not enumerated herein.

According to the vehicle of this embodiment of the present disclosure, the heat pump subsystem 101 is combined with the high-voltage system cooling subsystem 105 by adopting the integrated thermal management system 100 of the above embodiment, and the controller 104 determines the heat supplementation demand and the heat supplementation power according to the thermal management demand of the vehicle battery, the thermal management demand of the passenger compartment, and the state information of the heat pump subsystem 101. Thus, when the vehicle battery and/or the passenger compartment have/has a heating demand and the heat pump subsystem 101 cannot satisfy the heating demand, heat supplementation to the heat pump subsystem 101 through the high-voltage system cooling subsystem 105 may be supported, thereby satisfying the demands of the vehicle battery and/or the passenger compartment. In addition, the integrated thermal management system 100 of this embodiment of the present disclosure may realize the deep integration and cooperative control of the modules of the vehicle thermal management system, realize the efficient management of vehicle energy, improve the comprehensive utilization rate of the energy, and achieve a low cost.

Based on the integrated thermal management system 100 of the above embodiment, an embodiment of a third aspect of the present disclosure provides a thermal management control method. The thermal management control method according to this embodiment of the present disclosure will be described below with reference to FIG. 4 and FIG. 5.

Figure 4:
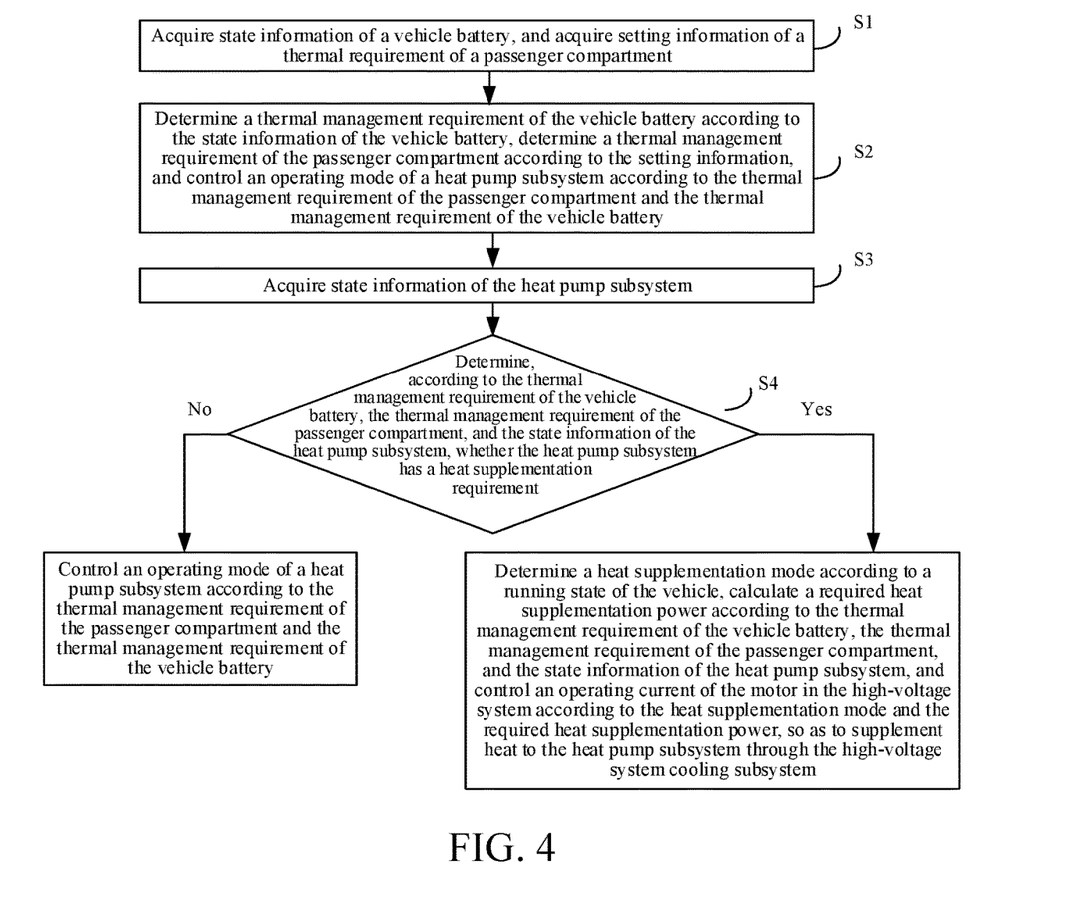
FIG. 4 is a flowchart of a thermal management control method according to an embodiment of the present disclosure.

FIG. 4 is a flowchart of a thermal management control method according to an embodiment of the present disclosure. As shown in FIG. 4, the thermal management control method includes the following steps:

S1: State information of a vehicle battery is acquired, and setting information of a thermal demand of a passenger compartment is acquired.

S2: A thermal management demand of the vehicle battery is determined according to the state information of the vehicle battery, a thermal management demand of the passenger compartment is determined according to the setting information, and an operating mode of a heat pump subsystem is controlled according to the thermal management demand of the passenger compartment and the thermal management demand of the vehicle battery.

S3: State information of the heat pump subsystem is acquired.

S4: It is determined, according to the thermal management demand of the vehicle battery, the thermal management demand of the passenger compartment, and the state information of the heat pump subsystem, whether the heat pump subsystem has a heat supplementation demand.

The state information of the battery is a parameter reflecting an internal state of the battery, such as the temperature, power, and voltage of the battery, and is used for determining whether the battery needs to be heated and determining a heating temperature. The setting information of the thermal demand of the passenger compartment includes a user setting of the thermal demand of the passenger compartment, for example, turning on and off air-conditioning refrigeration, turning on and off air-conditioning heating, whether heating and dehumidification are needed or whether the battery needs to be heated, and a heating temperature, and is used for determining the thermal management demand of the passenger compartment and the heating temperature. The state information of the heat pump subsystem includes, for example, internal and external temperatures of the vehicle, a refrigerant pressure and temperature, and the like, reflecting an energy state of the heat pump subsystem.

In an embodiment, when it is determined, according to the state information of the battery and the setting information of the thermal demand of the passenger compartment, that the vehicle battery and/or the passenger compartment have/has a heating demand, the operating mode of the heat pump subsystem is controlled according to the thermal management demand of the passenger compartment and the thermal management demand of the vehicle battery. According to the state information of the heat pump subsystem, it is determined whether the heating demand of the vehicle battery and/or the passenger compartment can be satisfied. If the heat pump subsystem cannot satisfy the heating demand of the vehicle battery and/or the passenger compartment, the heat pump subsystem has a heat supplementation demand. If the heat pump subsystem can satisfy the heating demand of the vehicle battery and/or the passenger compartment, the heat pump subsystem has no heat supplementation demand (e.g., does not need heat supplement).

Figure 5:
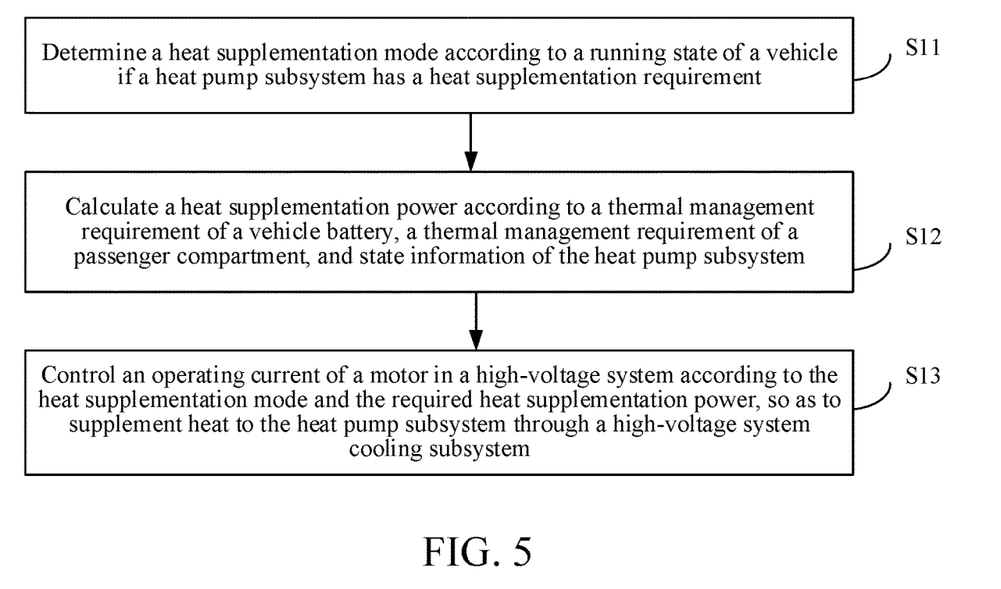
FIG. 5 is a flowchart of a thermal management control method according to an embodiment of the present disclosure.

In an implementation, the high-voltage system may include an electric drive system. The electric drive system includes a motor. As shown in FIG. 5, the thermal management control method of the present disclosure further includes the following steps:

S11: A heat supplementation mode is determined according to a running state of the vehicle if the heat pump subsystem has a heat supplementation demand.

In an embodiment, the high-voltage system may realize different functions in different running states of the vehicle. In a vehicle driving state, the high-voltage system may be controlled to realize a driving function. When the vehicle is connected to a charging pile through the high-voltage system, the vehicle is in a parking charging state, and the high-voltage system may be controlled to realize a boosting charging function. When the vehicle is in a parking state, the high-voltage system may also be controlled to generate heat. The electric drive system of the vehicle in different running states has different operating modes, and corresponding heat supplementation modes are also different. If it is determined that the heat pump subsystem has a heat supplementation demand, the heat supplementation mode in this case is determined according to the current running state of the vehicle.

S12: A heat supplementation power is calculated according to the thermal management demand of the vehicle battery, the thermal management demand of the passenger compartment, and the state information of the heat pump subsystem.

In an embodiment, heating temperature information of the vehicle battery and the passenger compartment may be obtained according to the thermal management demand of the vehicle battery and the thermal management demand of the passenger compartment. The state information of the heat pump subsystem reflects a current heat generation capacity of the heat pump subsystem, and the heat supplementation power of the heat pump subsystem may be calculated according to the heating temperature information of the vehicle battery and the passenger compartment and the current heat generation capacity of the heat pump subsystem.

S13: An operating current of the motor in the high-voltage system is controlled according to the heat supplementation mode and the heat supplementation power, so as to supplement heat to the heat pump subsystem through the high-voltage system cooling subsystem.

In an embodiment, a coolant pipe in the high-voltage system cooling subsystem is configured in contact with heating devices such as windings of the motor and an IGBT of a motor controller, and a coolant flowing therethrough may be heated by adjusting the heating quantity of the heating devices such as the windings of the motor and the IGBT of the motor controller. A motor current required for heat supplementation may be obtained according to the heat supplementation power. The high-voltage system may be controlled according to the heat supplementation mode and the motor current required for heat supplementation. By adjusting the current flowing through the high-voltage system, the components of the high-voltage system generate heat, and the heat generated by the high-voltage system heats the coolant in the high-voltage system cooling subsystem. The high-voltage system cooling subsystem performs heat exchange with the heat pump subsystem, thereby supplementing heat to the heat pump subsystem.

According to the thermal management control method of this embodiment of the present disclosure, whether the heat pump subsystem has a heat supplementation demand is determined according to the thermal management demand of the vehicle battery, the thermal management demand of the passenger compartment, and the state information of the heat pump subsystem, and a basis may be provided for heat supplementation to the heat pump subsystem by the high-voltage system cooling subsystem. Further, the heating demand of the vehicle battery and/or the passenger compartment may be satisfied.

In an embodiment of the present disclosure, the vehicle running state includes a traveling state, a parking state, and a motor boosting charging state.

If the vehicle is in the traveling state, a motor-driven heat supplementation mode is adopted. Under the motor-driven heat supplementation mode, the motor is controlled to operate at a preset driving power, so as to perform heat supplementation using heat generated by a motor-driven reactive power. The driving power is an output power of the motor, including an active power and a reactive power. The active power is used for driving, and the reactive power is used for generating waste heat. If the vehicle is in the parking state, a motor stalling heat generation heat supplementation mode is adopted. Under the motor stalling heat generation heat supplementation mode, the motor is controlled to operate at a preset stalling current, so as to perform heat supplementation using heat generated by a motor stalling reactive operation. If the vehicle is in the motor boosting charging state, a motor boosting cooperative heat generation heat supplementation mode is adopted. Under the motor boosting cooperative heat generation heat supplementation mode, the motor is controlled to operate at a preset charging current, and an unbalanced current is superimposed on three-phase winding operating currents of the motor (e.g., on each of the three-phase winding operating currents) to realize motor heat supplementation. The preset charging current is the sum of the three-phase winding operating currents, and the sum of the three-phase winding operating currents after the unbalanced current is superimposed remains equal to the preset charging current. It is to be understood that the preset charging current is used for charging the battery, and the three-phase winding operating currents are used for generating waste heat.

In an embodiment, when the vehicle is in the traveling state, the electric drive system runs to provide a driving force. The driving power outputted by the motor drive is divided into two parts: an active power that drives the rotation of the motor to generate torque to drive the vehicle to run; and heat generated by the motor and the motor controller in the running process, which belongs to a reactive power. That is, the driving power of the motor is equal to the sum of the active power and the reactive power. The reactive power causes a high-voltage device to generate heat. When the heat pump subsystem needs to be supplemented with heat, the utilization rate of energy may be improved and the waste of energy may be reduced by heat supplementation using the heat generated by the reactive power driven by the motor.

When the vehicle is in the parking state, the electric drive system does not operate. The motor may be stalled to generate heat by controlling the operating current of the motor. When the motor is stalled, the power thereof is used for heating, which may be understood as that the active power in the driving power of the motor is zero and the whole driving power of the motor is used for generating heat as the reactive power. Therefore, the heating efficiency is high. The heat pump subsystem is supplemented with heat by controlling the stalling heat generation of the motor. Additional parts are not needed, the own devices of the vehicle are fully utilized, an additional hardware structure is not needed, and the cost is low.

In the motor boosting charging state, the vehicle is connected to an external power supply device. The motor is used for realizing boosting charging. The motor controller is controlled to charge the motor at a preset charging current, and the motor will generate heat in the process of motor boosting charging.

In an embodiment, the preset charging current is a charging current outputted by the charging pile to the battery, which may be adjusted according to the output capacity of the charging pile or the voltage of the battery, and is a preset current for charging the battery. The three-phase winding operating currents of the motor are currents flowing therethrough when the three-phase windings of the motor operate. As shown in FIG. 3, the three-phase winding operating currents of the motor include ia, ib, and ic. The preset charging current is a vector sum of the three-phase winding operating currents. The preset charging current determines the charging power of the battery. The three-phase winding operating currents ia, ib, and ic of the motor determine the heating power of motor windings. When the battery is boosted and charged by the electric drive system, the winding operating currents ia, ib, and ic flow through three-phase bridge arms and three-phase windings of the motor controller of the electric drive system, respectively. On the basis of the three-phase winding operating currents satisfying the preset charging current, an unbalanced current is superimposed on the three-phase winding operating currents of the motor, and after the unbalanced current is superimposed, the sum of the three-phase winding operating currents remains equal to the preset charging current. That is, the preset charging current remains unchanged. For example, the unbalanced current is superimposed on the three-phase winding operating currents ia, ib, and ic, to obtain new three-phase winding operating currents ia+15, ib−10, and ic−5. The sum of the new three-phase winding operating currents ia+15, ib−10, and ic−5 is still equal to the preset charging current. As the unbalanced current difference between the three-phase winding operating currents is increased, the heating power of the motor is larger. In addition, the vehicle is connected to an external charging device in this case, and the external power supply device supplies energy to reduce the energy consumption of the battery. The vehicle energy may be fully integrated, thereby reducing the energy consumption of the vehicle.

In the thermal management control method provided by the present disclosure, the corresponding heat supplementation mode is adopted according to the traveling state of the vehicle, so that the energy of the high-voltage system may be more reasonably utilized. The heat generated under different operating states of the high-voltage system is used for supplementing heat to the heat pump subsystem, and the waste heat of the high-voltage system is flexibly utilized, thereby realizing the deep integration and cooperative control of the modules of the vehicle thermal management system, realizing the efficient management of the vehicle energy, improving the comprehensive utilization rate of the energy, and achieving a low cost.

In some embodiments, the demands of the user for adjusting the heat supplementation setting according to the own requirements may be adjusted by interaction between the interaction module and the user. In some embodiments, a heat supplementation setting selected by the user, such as an economic setting or a performance setting, may be inputted through the interaction module. In an embodiment, a heat supplementation setting confirmation instruction is transmitted in response to the heat supplementation demands. The interaction module is controlled to display the heat supplementation mode confirmation instruction. The interaction module receives the heat supplementation setting confirmed by the user. The controller controls the operating current of the motor in the high-voltage system according to the heat supplementation setting, the heat supplementation setting, and the heat supplementation power, so as to supplement heat to the heat pump subsystem through the high-voltage system cooling subsystem.

In an embodiment, when it is determined that the heat pump subsystem has a heat supplementation demand, the thermal management control method of this embodiment of the present disclosure may further include: receiving a heat supplementation setting confirmed by a user. The heat supplementation setting includes a performance setting and an economic setting. The economic setting refers to slow heating and temperature rise on the premise of energy consumption. The performance setting is rapid heating and temperature rise with a maximum capacity. For example, a vehicle controller transmits a heat supplementation setting instruction to the interaction module in response to a heat supplementation demand. A vehicle thermal management controller controls the interaction module to display selection information of the heat supplementation setting. The user may select the heat supplementation setting such as the economic setting or the performance setting by operating the interaction module. The vehicle thermal management controller controls the operating current of the motor in the high-voltage system according to the heat supplementation mode, the heat supplementation setting, and the heat supplementation power, so as to supplement heat to the heat pump subsystem through the high-voltage system cooling subsystem, thereby satisfying the vehicle heating demand and satisfying the user demands. By setting the performance and economic heat supplementation setting, the user may adjust the heat supplementation settings according to own requirements, so as to satisfy different requirements of slow heating or rapid heating, which is more humanized and flexible.

In an embodiment, the motor-driven heat supplementation mode may include a reactive heat generation heat supplementation mode and a motor waste heat supplementation mode. If the vehicle is in the traveling state and the heat supplementation setting is the performance setting, the reactive heat generation heat supplementation mode is adopted. Under the reactive heat generation heat supplementation mode, the active power of the motor remains outputted at a maintained torque, and the reactive power of the motor is increased until the reactive power is greater than the heat supplementation power.

In an embodiment, when the vehicle is in the traveling state, the output power of the motor must first ensure the driving requirement of the vehicle. If the heat supplementation setting of the heat pump subsystem is the performance setting, it is necessary to realize rapid heat generation within a tolerable power range of the motor, the active power of the motor remains outputted at a maintained torque, and the reactive power of the motor is increased until the reactive power of the motor is greater than the heat supplementation power. That is, the heat generated by the reactive power of the motor is greater than the heat supplementation power calculated according to the thermal management demand of the vehicle battery, the thermal management demand of the passenger compartment, and the state information of the heat pump subsystem. The motor can rapidly generate heat.

In an embodiment, if the vehicle is in the traveling state and the heat supplementation setting is the economic setting, the motor waste heat supplementation mode is adopted. Under the motor waste heat supplementation mode, an original driving power of the motor is kept when the reactive power of the motor is greater than the heat supplementation power. The active power of the motor remains outputted at a maintained torque, and the reactive power of the motor is increased to be equal to the heat supplementation power when the reactive power of the motor is less than the heat supplementation power.

In an embodiment, when the vehicle is in the traveling state and the heat supplementation setting is the economic setting, the high-voltage system only needs to satisfy the heat supplementation power of the heat pump subsystem when supplementing heat to the heat pump subsystem on the premise of energy consumption, and the output power of the motor must first ensure the driving requirement of the vehicle. It is determined whether the reactive power under the current driving power of the motor satisfies the heat supplementation power. When the reactive power of the motor is greater than the heat supplementation power, the active power in the current driving power of the motor may maintain the driving requirement of the vehicle, and the reactive power may maintain the heat supplementation power of the heat pump subsystem. Then the original driving power of the motor is kept. When the reactive power of the motor is less than the heat supplementation power, the active power in the current driving power of the motor remains outputted at a maintained torque to ensure the driving requirement of the vehicle, and the reactive power of the motor is increased to be equal to the heat supplementation power, so that the motor satisfies the heat supplementation power for heat generation.

In an embodiment, the motor stalling heat generation heat supplementation mode includes a first stalling heat generation heat supplementation mode and a second stalling heat generation heat supplementation mode. If the vehicle is in the parking state and the heat supplementation setting is the performance setting, the first stalling heat generation heat supplementation mode is adopted to realize rapid heat generation within the tolerable power range of the motor. When the vehicle is in the parking state, there is a current flowing through the motor, but no torque will be generated. Under the first stalling heat generation heat supplementation mode, the power of the electric drive system is used for heating, which may be understood that the active power in the driving power of the motor is zero and the whole driving power of the motor is used for generating heat as the reactive power. Therefore, the heating efficiency is high. By increasing the stalling current of the motor, the reactive power of the motor is improved until the heating power of the motor under the stalling current is greater than the heat supplementation power to meet the heat supplementation demand.

It is to be understood that the heating power of the motor under the stalling current is the reactive power of the motor.

In an embodiment, if the vehicle is in the parking state and the heat supplementation setting is the electric setting, the second stalling heat generation heat supplementation mode is adopted. The motor generates heat with the reactive power equal to the heat supplementation power of the heat pump subsystem, so as to ensure the heat supplementation demand of the heat pump subsystem. Under the second stalling heat generation heat supplementation mode, by increasing the stalling current of the motor, the reactive power of the motor is improved until the heating power of the motor under the stalling current is equal to the heat supplementation power, so as to ensure the heat supplementation demand of the heat pump subsystem.

In an embodiment, the motor boosting cooperative heat generation heat supplementation mode includes a first boosting cooperative heat generation heat supplementation mode and a second boosting cooperative heat generation heat supplementation mode. If the vehicle is in the motor boosting charging state and the heat supplementation setting is the performance setting, the first boosting cooperative heat generation heat supplementation mode is adopted. Under this mode, the motor is controlled to operate at the preset charging current to ensure the charging power of the battery, and the unbalanced current of the three-phase windings of the motor is increased until the heating power of the motor is greater than the heat supplementation power. That is, the unbalanced current is superimposed on the three-phase winding operating currents, so that the difference between absolute values of the three-phase winding operating currents is increased. The superimposition of the unbalanced current on the three-phase winding operating currents may be understood as that different three-phase winding operating currents generate an unbalanced current difference. For example, the three-phase winding operating currents of the motor are ia, ib, and ic. A boosting charging current of the motor to the battery is the sum of the three-phase winding operating currents ia, ib, and ic. The boosting charging current of the motor to the battery is the preset charging current. If the preset charging current is constant, the sum of ia, ib, and ic is constant. The superimposition of the unbalanced current on the three-phase winding operating currents may be understood as superimposing a balance value on ia, ib, and ic, so that the sum of ia, ib, and ic is constant, and the difference between absolute values of ia, ib, and ic is increased. Therefore, the unbalanced current difference formed on the three-phase windings of the motor is larger, thus making the heating power of the motor larger until the heating power of the motor is greater than the heat supplementation power.

In an embodiment, if the vehicle is in the motor boosting charging state and the heat supplementation setting is the economic setting, the second boosting cooperative heat generation heat supplementation mode is adopted. If the heating power of the motor is greater than the heat supplementation power under the three-phase winding operating currents of the motor. The three-phase winding operating currents corresponding to the preset charging current of the motor is kept. That is, the unbalanced current superposition value of the three-phase winding operating currents of the motor is zero. If the heating power of the motor is less than the heat supplementation power under the three-phase winding operating currents, the unbalanced current superposition value of the three-phase winding operating currents is increased until the heating power is equal to the heat supplementation power.

From above, a suitable heat supplementation mode is adopted according to the vehicle state and the heat supplementation setting, so that the vehicle energy can be fully integrated, an additional hardware structure is not needed, and the cost is low.

In some embodiments, the state information of the heat pump subsystem includes a refrigerant temperature, a refrigerant pressure, and an ambient temperature. The process of determining, according to the state information of the heat pump subsystem, whether the heat pump subsystem has a heat supplementation demand includes the following steps.

It is determined that the heat pump subsystem has a heat supplementation demand if the refrigerant temperature is lower than a refrigerant temperature threshold or the refrigerant pressure is lower than a refrigerant pressure threshold, or it is determined that the heat pump subsystem has no heat supplementation demand if the refrigerant temperature is not lower than the refrigerant temperature threshold and the refrigerant pressure is not lower than the refrigerant pressure threshold, when the ambient temperature is lower than an ambient temperature threshold. In an embodiment, it is determined that the heat pump subsystem has no heat supplementation demand when the ambient temperature is higher than an ambient temperature threshold.

For example, when the vehicle battery and/or the passenger compartment have/has a heating demand, the refrigerant temperature is lower than the refrigerant temperature threshold and/or the refrigerant pressure is lower than the refrigerant pressure threshold in a case that the ambient temperature is lower than the ambient temperature threshold. That is, it is determined that the heat pump subsystem has a heat supplementation demand if the refrigerant temperature is lower than the refrigerant temperature threshold or the refrigerant pressure is lower than the refrigerant pressure threshold. In an embodiment, it is determined that the heat pump subsystem has no heat supplementation demand if the refrigerant temperature is not lower than the refrigerant temperature threshold and the refrigerant pressure is not lower than the refrigerant pressure threshold. In an embodiment, it is determined that the heat pump subsystem has no heat supplementation demand when the ambient temperature is higher than an ambient temperature threshold. If it is determined that the heat pump subsystem has the heat supplementation demand, the heat supplementation power is obtained according to the state information of the heat pump subsystem. Then the controller transmits the heat supplementation demand and the heat supplementation power to the vehicle, so as to control the operating current of the motor in the high-voltage system, and perform heat exchange with the heat pump subsystem through the high-voltage system cooling subsystem, thereby supplementing heat to the heat pump subsystem, and satisfying the requirements of the vehicle battery and/or the passenger compartment.

In some embodiments, the thermal management control method further includes: acquiring temperature information of the high-voltage system and the high-voltage system cooling subsystem; determining a thermal management demand of the high-voltage system cooling subsystem according to the temperature information; and controlling an operating mode of the high-voltage system cooling subsystem according to a thermal management demand of the high-voltage system cooling subsystem.

In an embodiment, the demands for cooling, heating, and heating dehumidification of the passenger compartment are set by the user. The requirements for cooling and heating of the battery are from the comparison between a dynamic detection value of a battery state (temperature, voltage, state of charge, etc.) and a preset suitable operating battery state (temperature, voltage, state of charge, etc.). The cooling demands of the high-voltage system are from the comparison between dynamic detection values of component and cooling loop temperatures of the high-voltage system and a preset suitable operating high-voltage system state (component temperature and cooling loop temperature, etc.). Each demand is transmitted to a heat pump subsystem controller, the vehicle controller, and the vehicle thermal management controller through defined signal values. The systems for the battery and the passenger compartment are the heat pump subsystems, and the systems for the high-voltage system are separate detection modules and execution components.

Thus, the vehicle energy is rationally utilized by the control method, and the energy utilization rate is high. In addition, the intelligent control of the system is realized, and the vehicle driving experience is improved. Furthermore, the flow of energy among the battery, the environment, the high-voltage system, and the passenger compartment is realized through the control method, and the high-integration energy management is realized.

In an embodiment, when the heat pump subsystem controller and the vehicle controller receive relevant demand signals, it is first self-checked whether the system is normal. The heat pump subsystem needs to self-check whether the refrigerant pressure and temperature of the system are in the normal range and whether the sampling of each sensor is normal. The high-voltage system cooling system needs to self-check whether an electronic water pump and an electronic fan are normal and whether the sampling of each temperature and water temperature sensor is normal. In the case of abnormality, abnormal fault signals are transmitted to each controller and to the vehicle thermal management controller, and reminding signals are transmitted to user instruments according to the severity. In the case of normality, the heat pump subsystem comprehensively determines that the system operates in different operating modes according to the passenger compartment demand and the battery demand, and the high-voltage cooling subsystem determines that the system operates in different operating modes according to whether the heat pump subsystem needs to be supplemented with heat.

In some embodiments, when the performance of the heat pump subsystem is poor, the high-voltage system is controlled to supplement heat to the heat pump subsystem through the high-voltage system cooling subsystem. The motor controller controls the motor to operate in several operating modes, such as the motor-driven heat supplementation mode, the motor stalling heat generation heat supplementation mode, and the motor boosting cooperative heat generation heat supplementation mode, so as to generate different heat and supplement the heat to a refrigerant loop of the heat pump subsystem to realize heat supplementation. Thus, heat generated by the motor may be fully utilized. The motor is actively controlled to generate heat during traveling and charging, so as to realize the deep integration and cooperative control of the modules of the vehicle thermal management system, realize the efficient management of the vehicle energy, and improve the comprehensive utilization rate of the energy. The heat generated by the motor is utilized, motor parts are reused to realize the heating function, and the system cost is reduced on the basis of realizing performance and multiple functions. A suitable operating temperature of the non-enthalpy-increasing heat pump subsystem reaches about −25° C., and the energy consumption is reduced.

From above, in the thermal management control method of this embodiment of the present disclosure, the heat pump subsystem and the high-voltage system cooling subsystem are combined. When the heat pump subsystem has no heat supplementation demand, the operating mode of the heat pump subsystem may be controlled according to the thermal management demand of the vehicle battery and the thermal management demand of the passenger compartment. In an embodiment, when the heat pump subsystem has a heat supplementation demand, the high-voltage system may be controlled to supplement heat to the heat pump subsystem through the high-voltage system cooling subsystem, and the operating mode of the high-voltage system cooling subsystem may be controlled according to the state information of the high-voltage system. Thus, the vehicle energy may be rationally utilized, the heat flow between the passenger compartment and the battery is realized, the energy management is realized, the user requirements are satisfied, and the driving and taking experiences are improved.

The control of the operating modes of the heat pump subsystem 101 and the high-voltage system cooling subsystem according to different thermal management demands is described below with FIG. 1 and FIG. 5 as examples.

In some embodiments, if it is determined that the passenger compartment has a refrigeration demand and the vehicle battery has a cooling demand, the heat pump subsystem 101 is controlled to run a first heat pump operating mode. As shown in FIG. 2, in the first heat pump operating mode, the second electromagnetic valve 16, the third electromagnetic valve 24, and the fifth electromagnetic valve 30 are controlled to be turned off, the first electromagnetic valve 6 and the fourth electromagnetic valve 25 are controlled to be turned on, and a target caliber of the throttle valve 23 in the heat pump subsystem 101 is obtained to adjust the throttle valve 23 according to the system pressure and the pressure requirement under the operating mode. As shown in FIG. 2, under the first heat pump operating mode, a refrigerant flow loop is: compressor 1→first heat exchanger 3 (in-vehicle condenser) 3→electromagnetic electronic expansion valve 5→electromagnetic valve 6→out-of-vehicle condenser 7→one-way valve 13→(one-way valve 18→two-way electronic expansion valve 19→battery pack direct-cooling plate 21→throttle valve 23→electromagnetic valve 25)/(electronic expansion valve 32→evaporator 31→one-way valve 29)→one-way valve 26→gas-liquid separator 27→compressor 1. Thus, the passenger compartment is cooled by the heat exchange of the first heat exchanger 3 (in-vehicle condenser) 3, and the battery is cooled by the battery pack direct-cooling plate 21.

In an embodiment, it is determined that the high-voltage system has a cooling demand, and the high-voltage system cooling subsystem 105 is controlled to run a first high-voltage cooling operating mode. As shown in FIG. 2, in the first high-voltage cooling operating mode, ports A and B of the three-way valve 10 in the high-voltage system cooling subsystem 105 are controlled to be turned off while ports B and C are controlled to be turned off, and ports A and C of the three-way valve 10 are controlled to be communicated. A coolant flow loop is: water pump 12→plate heat exchanger 15→three-way valve 10AC→motor radiator 8→high-voltage system 11→water pump 12. Thus, heat dissipation and cooling of the high-voltage system 11 are realized.

In some embodiments, if it is determined that the heat pump subsystem 101 has no heat supplementation demand, the operating mode of the heat pump subsystem 101 is controlled according to the thermal management demand of the passenger compartment and the thermal management demand of the battery. The refrigerant flow loop may be set according to the actual situation with reference to FIG. 2, and will not be described herein.

In some embodiments, the heat pump subsystem 101 compares a demand value with values collected by the existing system sensors, looks up the table to obtain target values such as a rotating speed of the compressor 1, a rotating speed of the electronic fan 9, blower gears, the electronic expansion valve, and a damper opening, and transmits the target values to the execution components for operation. Especially in the first heat pump operating mode and the third heat pump operating mode, it is necessary to look up the caliber of the caliber-adjustable throttle valve 23 according to the current system pressure and requirement, and then adjust the refrigerant pressure and temperature at the battery pack direct-cooling plate and the evaporator of the system to satisfy the requirement. The looked-up table is calculated and calibrated by the system and component levels and corrected according to the performance of the vehicle.

In an embodiment, the process of controlling the high-voltage system to supplement heat to the heat pump subsystem through the high-voltage system cooling subsystem according to the heat supplementation mode, the heat supplementation setting, and the heat supplementation power includes the following cases.

If there is a battery heating demand and it is determined that the heat pump subsystem needs to be connected to the high-voltage system for heat supplementation, when the vehicle controller receives the heat supplementation demand and the heat supplementation power of the heat pump subsystem, the first step is to detect the vehicle speed, gear, and charging connector signal of the vehicle to confirm that the operating state of the motor is driving, parking, or charging. For example, if the connector is not connected, the vehicle is allowed to discharge, and the gear is a parking gear, the vehicle is in the parking state. If the connector is not connected, the vehicle is allowed to discharge, and the gear is a traveling gear, the vehicle is in the driving state. If the connector is connected and the vehicle is allowed to charge, the vehicle is in the parking charging state.

If the vehicle is in the traveling state and the heat supplementation setting is the performance setting, the reactive heat generation heat supplementation mode is adopted. Under the reactive heat generation heat supplementation mode, the active power of the motor remains outputted at a maintained torque, and the reactive power of the motor is increased until the reactive power is greater than the heat supplementation power. A first switch and a second switch in the high-voltage system are both turned off by default.

In an embodiment, if the vehicle is in the traveling state and the heat supplementation setting is the economic setting, the motor waste heat supplementation mode is adopted. Under the motor waste heat supplementation mode, an original driving power of the motor is kept when the reactive power of the motor is greater than the heat supplementation power. In an embodiment, the active power of the motor remains outputted at a maintained torque, and the reactive power of the motor is increased to be equal to the heat supplementation power when the reactive power of the motor is less than the heat supplementation power. The first switch and the second switch in the high-voltage system are both turned off by default.

In an embodiment, if the vehicle is in the parking state and the heat supplementation setting is the performance setting or the economic setting, the motor stalling heat generation heat supplementation mode is adopted. Under the first stalling heat generation heat supplementation mode, the stalling current of the motor is increased until the heating power of the motor under the stalling current is greater than the heat supplementation power. Under the second stalling heat generation heat supplementation mode, the stalling current of the motor is increased until the heating power of the motor under the stalling current is equal to the heat supplementation power. The first switch and the second switch in the high-voltage system are both turned off by default.

In an embodiment, if the vehicle is in the motor boosting charging state and the heat supplementation setting is the performance setting, the first boosting cooperative heat generation heat supplementation mode is adopted. The motor is controlled to operate at the preset charging current, and the unbalanced current of the three-phase windings of the motor is increased until the heating power is greater than the heat supplementation power. In an embodiment, when the vehicle is in the motor boosting charging state and the heat supplementation setting is the economic setting, if the heating power of the motor under the three-phase winding operating currents of the motor is greater than the heat supplementation power, the three-phase winding operating currents corresponding to the preset charging current of the motor are kept. If the heating power of the motor under the three-phase winding operating currents of the motor is less than the heat supplementation power, the superimposition value of the unbalanced current of the three-phase winding operating currents is increased until the heating power is equal to the heat supplementation power. Under the motor boosting cooperative heat generation heat supplementation mode, the first switch and the second switch in the high-voltage system are both turned on by default.

In an implementation of the present disclosure, the motor current satisfying the heat supplementation power is converted according to the current voltage. Then the heat supplementation setting confirmation instruction is transmitted to the high-voltage system controller, to the vehicle thermal management controller, and to the instrument for selection by the user. After a feedback instruction generated according to a user selection instruction is transmitted to the vehicle controller, the magnitudes of the current motor current and the motor current corresponding to the heat supplementation demand are compared. In combination with an optional heat supplementation mode, a motor operating state command and operating current are transmitted to the motor controller to supplement heat to the heat pump system. The temperatures of the motor, the motor controller, and the inductor are detected and protected in real time during the vehicle finishing to ensure that the high-voltage system is controlled to supplement heat to the heat pump system without burning out the devices.

As shown in FIG. 3, K1 and K2 are turned off during stalling heat generation heat supplementation. The motor controller controls the motor to operate at a certain same current value to generate heat according to the operating current. Under the motor-driven heat supplementation mode, K1 and K2 are turned off, and the motor controller controls the motor to operate under the current value according to the current required/needed for driving. Under the reactive heat generation heat supplementation mode, K1 and K2 are turned off, and the motor controller controls the motor to switch from an energy consumption priority torque and speed map table to a heating priority torque and speed map table, and checks and controls the motor to operate under the corresponding torque current and excitation current according to the operating current.

Under the motor boosting cooperative heat generation heat supplementation mode, K1 and K2 are turned on. Taking charging in a low temperature environment as an example, the battery needs to be heated and the heat pump system needs to be supplemented with heat. The charging in the low temperature environment usually goes through three stages.

The first stage is a heating-dominated charging stage. In this stage, since the battery temperature is low, the charging capacity is weak, and the charging current is small. That is, the heating demand is large, and the battery temperature needs to be raised as soon as possible. The corresponding heat supplementation current of the heat pump system is large to realize a high-power heat generation heat supplementation heat pump system under the condition of small current charging of the battery. In this stage, heat generation heat supplementation is mainly used. After the charging pile outputs the current to a bus capacitor, the heat generation heat supplementation is controlled to consume the power on the capacitor. After offset, the battery charging current is very small. Therefore, the current on the inductor is very small, but the current flowing through the motor and the motor controller is large, and it is necessary to perform real-time temperature detection and protection to ensure that the heat supplementation operating current may be controlled without burning out the devices.

Then, with the rise of the battery temperature, the charging capacity of the battery is continuously enhanced, and the charging current is continuously increased. Also, a larger heat supplementation power is guaranteed, and the temperature of the battery is also continuously rising. In addition, due to a larger charging current, there will be a certain heating quantity inside the battery, and the heating demand of the battery is slightly reduced. The corresponding heat supplementation power of the heat pump system is also slightly reduced. The current outputted from the charging pile to the bus capacitor is larger, and the heat generation heat supplementation is controlled to consume a small current on the capacitor. After offset, the battery charging current is large. Therefore, the current flowing through the inductor, the motor, and the motor controller is large, and it is necessary to perform real-time temperature detection and protection to ensure that the charging current and the heat supplementation operating current of the battery are controlled to be optimal in coordination without burning out the devices.

Finally, after the battery temperature is high, high-power direct current charging may be performed, and much heat will be generated inside the battery, which is beneficial to keeping the battery temperature. Therefore, the requirement for the heating power will be reduced, and the corresponding heat supplementation demand of the heat pump system will also be reduced. Charging is mainly performed in this stage. The current outputted from the charging pile to the bus capacitor is larger, and the heat generation heat supplementation is controlled to consume a small current on the capacitor. After offset, the battery charging current is large. Therefore, the current flowing through the inductor is large, and it is necessary to perform real-time temperature detection and protection to ensure that the charging power of the battery is controlled to be maximal without burning out the devices.

It is to be noted that based on the architecture of the integrated thermal management system of this embodiment of the present disclosure, the scheme of adding an air-supplementing enthalpy-increasing loop and an enthalpy-increasing compressor, such as a regenerator, a subcooler, or a flasher, is a heat supplementation means for a heat pump system. The principles and structures are basically the same, which may be regarded as a deformation of the technical method of the present disclosure. In addition, the integrated thermal management system of this embodiment of the present disclosure includes multiple three-way valves, electromagnetic valves, electromagnetic electronic expansion valves, and the like. The thermal management system for changing the type and style of valve bodies, such as integrated valve bodies (physically integrated and functionally integrated), four-way valves, and other special-shaped valve bodies, is a loop control and switching component for realizing the same principle and the same control, and also protects the system architecture protection range of this embodiment of the present disclosure. In addition, a control method based on waste heat supplementation and reactive power heat supplementation during driving, stalling during parking and controlling unbalanced heat generation of three-phase currents of the motor, that is, controlling active and passive heat generation during charging and discharging of the motor, is also a deformation of the present disclosure.

Generally speaking, the integrated thermal management system, the vehicle, and the thermal management control method of this embodiment of the present disclosure may achieve more intelligent control when using the vehicle and booking the vehicle, and the comprehensive energy utilization rate of the vehicle is higher.

In the description of this specification, the description of the reference terms such as "an embodiment", "some embodiments", "exemplary embodiments", "example", "specific example", or "some examples" means that the features, structures, materials or characteristics described with reference to the embodiment or example are included in at least one embodiment or example of the present disclosure. In this specification, schematic representations of the above terms do not necessarily refer to the same embodiment or example.

While the embodiments of the present disclosure have been shown and described, it will be appreciated by those of ordinary skill in the art that various changes, modifications, substitutions, and variations may be made to these embodiments without departing from the principles and spirit of the present disclosure, and the scope of the present disclosure is defined by the claims and their equivalents.

What is claimed is:

1. An integrated thermal management system, comprising:
   a heat pump subsystem, comprising a heat pump subsystem detector configured to detect heat pump state information of the heat pump subsystem;
   a high-voltage system comprising a cooling subsystem, configured to exchange heat between the heat pump subsystem and the high-voltage system;
   a battery detector, configured to detect battery state information of a vehicle battery;
   a user interface, configured to receive setting information of a thermal demand of a passenger compartment of a vehicle; and
   a controller, configured to determine a thermal management demand of the vehicle battery according to the battery state information, determine a thermal management demand of the passenger compartment according to the setting information, determine a heat supplementation demand according to the thermal management demand of the vehicle battery, the thermal management demand of the passenger compartment, and the heat pump state information, and in response to the heat supplementation demand, determine a heat supplementation mode according to a running state of the vehicle, obtain a heat supplementation power according to the heat pump state information, and control an operating current of a motor in the high-voltage system according to the heat supplementation power and the heat supplementation mode, to supplement heat to the heat pump subsystem through the cooling subsystem of the high-voltage system.

2. The integrated thermal management system according to claim 1, wherein
the high-voltage system comprises an electric drive system having the motor.

3. A vehicle, comprising an integrated thermal management system, wherein the integrated thermal management system comprises:
a heat pump subsystem, comprising a heat pump subsystem detector configured to detect heat pump state information of the heat pump subsystem;
a high-voltage system comprising a cooling subsystem, configured to exchange heat between the heat pump subsystem and the high-voltage system;
a battery detector, configured to detect battery state information of a vehicle battery;
a user interface, configured to receive setting information of a thermal demand of a passenger compartment of the vehicle; and
a controller, configured to determine a thermal management demand of the vehicle battery according to the battery state information, determine a thermal management demand of the passenger compartment according to the setting information, determine a heat supplementation demand according to the thermal management demand of the vehicle battery, the thermal management demand of the passenger compartment, and the heat pump state information, and in response to the heat supplementation demand, determine a heat supplementation mode according to a running state of the vehicle, obtain a heat supplementation power according to the heat pump state information, and control an operating current of a motor in the high-voltage system according to the heat supplementation power and the heat supplementation mode, to supplement heat to the heat pump subsystem through the cooling subsystem of the high-voltage system.

4. The vehicle according to claim 3, wherein the integrated thermal management system further comprises:
the high-voltage system comprises an electric drive system having the motor.

5. A thermal management control method, comprising:
acquiring battery state information of a vehicle battery, and acquiring setting information of a thermal demand of a passenger compartment;
determining a thermal management demand of the vehicle battery according to the battery state information of the vehicle battery, determining a thermal management demand of the passenger compartment according to the setting information, and controlling an operating mode of a heat pump subsystem according to the thermal management demand of the passenger compartment and the thermal management demand of the vehicle battery;
acquiring heat pump state information of the heat pump subsystem;

determining, according to the thermal management demand of the vehicle battery, the thermal management demand of the passenger compartment, and the heat pump state information, whether the heat pump subsystem has a heat supplementation demand; and
in response to determining that the heat pump subsystem has the heat supplementation demand, determining a heat supplementation mode according to a running state of a vehicle, calculating a heat supplementation power according to the thermal management demand of the vehicle battery, the thermal management demand of the passenger compartment, and the heat pump state information of the heat pump subsystem, and controlling an operating current of a motor of a high-voltage system according to the heat supplementation mode and the heat supplementation power, to supplement heat to the heat pump subsystem through a cooling subsystem of the high-voltage system.

6. The thermal management control method according to claim 5, wherein the determining the heat supplementation mode according to the running state of the vehicle comprises:
in response to that the vehicle is in a traveling state, supplementing heat generated by a reactive power of the motor under a motor-driven heat supplementation mode;
in response to that the vehicle is in a parking state, supplementing heat generated by a motor stalling reactive operation under a motor stalling heat generation heat supplementation mode; and
in response to that the vehicle is in a motor boosting charging state, controlling the motor to operate at a charging current under a motor boosting cooperative heat generation heat supplementation mode, superimposing an unbalanced current on each of three-phase winding operating currents of the motor to obtain superimposed three-phase winding operating currents for the motor to generate heat, and maintaining a sum of the superimposed three-phase winding operating currents to be equal to the charging current.

7. The thermal management control method according to claim 6, further comprising:
receiving a heat supplementation setting confirmed by a user, the heat supplementation setting comprising a performance setting and an economic setting; and
controlling the operating current of the motor in the high-voltage system according to the heat supplementation mode, the heat supplementation setting, and the heat supplementation power, to supplement heat to the heat pump subsystem through the cooling subsystem of the high-voltage system.

8. The thermal management control method according to claim 7, wherein the controlling the operating current of the motor in the high-voltage system according to the heat supplementation mode, the heat supplementation setting, and the heat supplementation power, to supplement heat to the heat pump subsystem through the cooling subsystem of the high-voltage system comprises:
in response to that the vehicle is in the traveling state and the heat supplementation setting is the performance setting, outputting an active power of the motor at a maintained torque and increasing the reactive power of the motor, and stopping outputting the active power of the motor at the maintained torque and stopping increasing the reactive power of the motor when the reactive power is greater than the heat supplementation power; or in response to that the vehicle is in the traveling state and the heat supplementation setting is the economic setting, keeping a driving power of the motor when the reactive power of the motor is greater than the heat supplementation power, or outputting an active power of the motor at a maintained torque and increasing the reactive power of the motor to be equal to the heat supplementation power when the reactive power of the motor is less than the heat supplementation power.

9. The thermal management control method according to claim 7, wherein the controlling the operating current of the motor in the high-voltage system according to the heat supplementation mode, the heat supplementation setting, and the heat supplementation power, to supplement heat to the heat pump subsystem through the cooling subsystem of the high-voltage system comprises:

in response to that the vehicle is in the parking state and the heat supplementation setting is the performance setting, increasing a stalling current of the motor, and stopping increasing the stalling current of the motor when a heating power of the motor is greater than the heat supplementation power under the stalling current; or in response to that the vehicle is in the parking state and the heat supplementation setting is the economic setting, increasing a stalling current of the motor, and stopping increasing the stalling current of the motor when a heating power of the motor is equal to the heat supplementation power under the stalling current.

10. The thermal management control method according to claim 7, wherein the controlling the operating current of the motor in the high-voltage system according to the heat supplementation mode, the heat supplementation setting, and the heat supplementation power, to supplement heat to the heat pump subsystem through the cooling subsystem of the high-voltage system comprises:

in response to that the vehicle is in the motor boosting charging state and the heat supplementation setting is the performance setting, controlling the motor to operate at the charging current and increasing an unbalanced current superimposition value of the superimposed three-phase winding operating currents, and stopping controlling the motor to operate at the charging current and stopping increasing the unbalanced current superimposition value of the superimposed three-phase winding operating currents when a heating power of the motor is greater than the heat supplementation power; or in response to that the vehicle is in the motor boosting charging state and the heat supplementation setting is the economic setting, maintaining the three-phase winding operating currents corresponding to the charging current of the motor when a heating power of the motor is greater than the heat supplementation power under the three-phase winding operating currents of the motor, and when the heating power of the motor is less than the heat supplementation power under the superimposed three-phase winding operating currents of the motor, increasing an unbalanced current superimposition value of the superimposed three-phase winding operating currents, and stopping increasing the unbalanced current superimposition value of the superimposed three-phase winding operating currents when the heating power of the motor is equal to the heat supplementation power.

11. The thermal management control method according to claim 5, wherein the heat pump state information of the heat pump subsystem comprises a refrigerant temperature, a refrigerant pressure, and an ambient temperature, and the determining, according to the heat pump state information, whether the heat pump subsystem has a heat supplementation demand comprises:

in response to that the ambient temperature is lower than an ambient temperature threshold, determining that the heat pump subsystem has a heat supplementation demand when the refrigerant temperature is lower than a refrigerant temperature threshold or the refrigerant pressure is lower than a refrigerant pressure threshold, and determining that the heat pump subsystem has no heat supplementation demand when the refrigerant temperature is not lower than the refrigerant temperature threshold and the refrigerant pressure is not lower than the refrigerant pressure threshold; or in response to that the ambient temperature is higher than an ambient temperature threshold, determining that the heat pump subsystem has no heat supplementation demand.

12. The thermal management control method according to claim 5, further comprising:

acquiring temperature information of the high-voltage system and the cooling subsystem of the high-voltage system;

determining a thermal management demand of the cooling subsystem of the high-voltage system according to the temperature information; and controlling an operating mode of the cooling subsystem of the high-voltage system according to a thermal management demand of the high-voltage system.

* * * * *